(12) United States Patent
Bess

(10) Patent No.: US 9,575,714 B2
(45) Date of Patent: Feb. 21, 2017

(54) AGGREGATE DISPLAY

(75) Inventor: Charles Bess, McKinney, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2197 days.

(21) Appl. No.: 12/639,877

(22) Filed: Dec. 16, 2009

(65) Prior Publication Data
US 2011/0140993 A1    Jun. 16, 2011

(51) Int. Cl.
*G09G 5/00* (2006.01)
*G06F 3/147* (2006.01)

(52) U.S. Cl.
CPC ........... *G06F 3/147* (2013.01); *G09G 2370/16* (2013.01); *G09G 2380/04* (2013.01)

(58) Field of Classification Search
None
See application file for complete search history.

(56) References Cited

U.S. PATENT DOCUMENTS

| | | | |
|---|---|---|---|
| 2003/0151562 A1* | 8/2003 | Kulas | 345/1.1 |
| 2005/0030255 A1* | 2/2005 | Chiu | G06F 3/04883 345/1.3 |
| 2007/0276734 A1 | 11/2007 | Littman | |
| 2008/0010871 A1* | 1/2008 | Holmes | G06F 1/3203 40/1 |
| 2008/0046345 A1 | 2/2008 | Serre | |
| 2008/0278408 A1* | 11/2008 | Strickland | G09F 19/22 345/1.1 |
| 2010/0045705 A1* | 2/2010 | Vertegaal | A47G 19/2227 345/661 |

* cited by examiner

*Primary Examiner* — Joseph Haley
*Assistant Examiner* — Ifedayo Iluyomade
(74) *Attorney, Agent, or Firm* — HP Patent Department

(57) ABSTRACT

Techniques for incorporating an electrically mutable display in product packaging and forming an aggregate display therefrom are disclosed herein. A system includes a plurality of display systems. Each display system includes a display device. The display systems are configured to form an aggregate display including the display device of each display system. Each display system is configured to determine the relative location of the display system among the plurality of display systems. Based on the determined location, each display system provides, via the display device of the display system, a portion of the aggregate display.

18 Claims, 3 Drawing Sheets

CENTRAL CONTROLLER 130

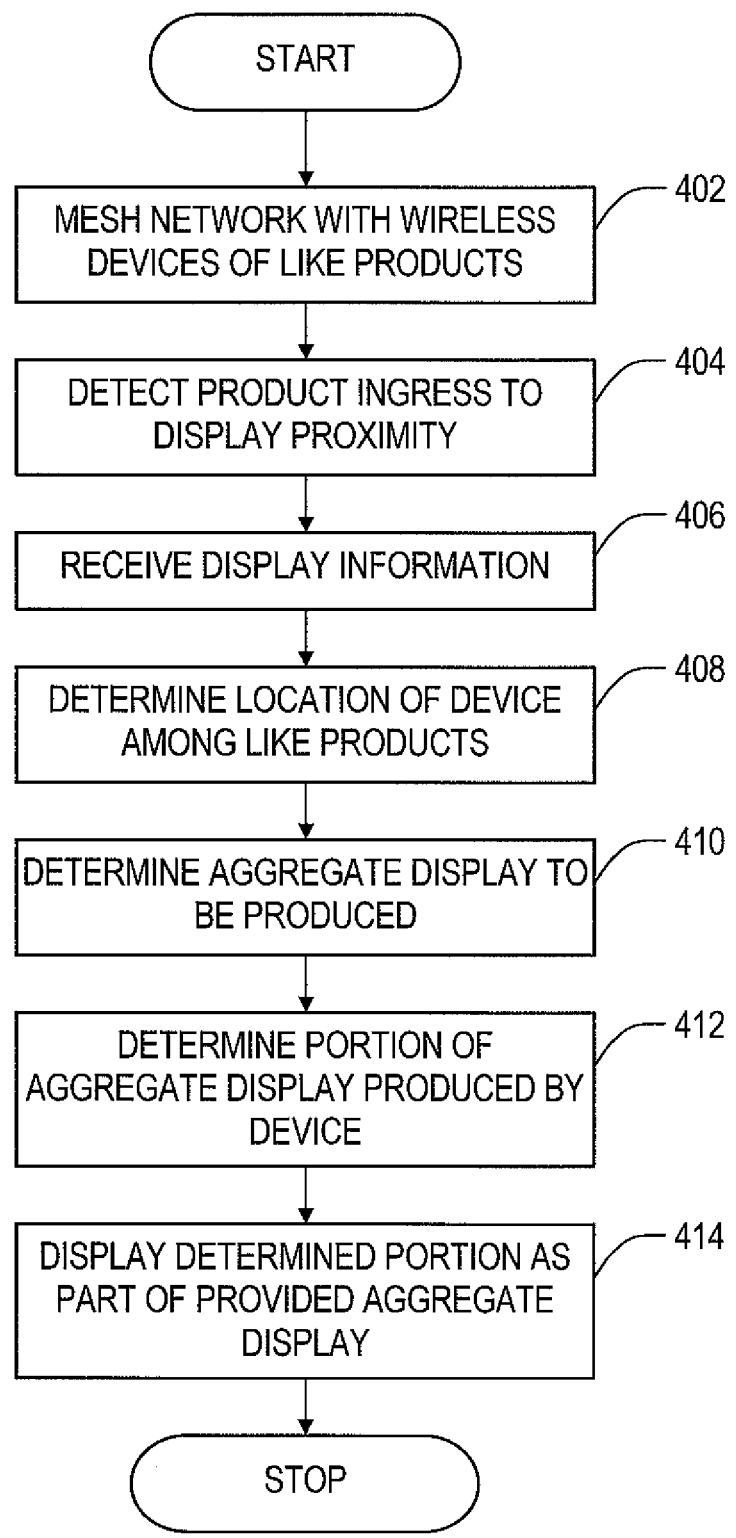

AGGREGATE DISPLAY

BACKGROUND

Retail shelf space is limited, and manufacturers compete to acquire and maintain display locations perceived to garner the attention of consumers. To increase the probability of drawing the consumer's attention to a product, manufacturers provide product packaging designed to draw the consumer to the product. Packaging may be formulated to entertain and inform the consumer, and ultimately to influence consumer purchasing decisions. Product packaging has generally been confined to static media such as printed paper or plastic.

BRIEF DESCRIPTION OF THE DRAWINGS

For a detailed description of exemplary embodiments of the invention, reference will now be made to the accompanying drawings in which:

FIG. 4 shows a flow diagram for a method of providing an aggregate display in accordance with various embodiments.

NOTATION AND NOMENCLATURE

Figure 1A:
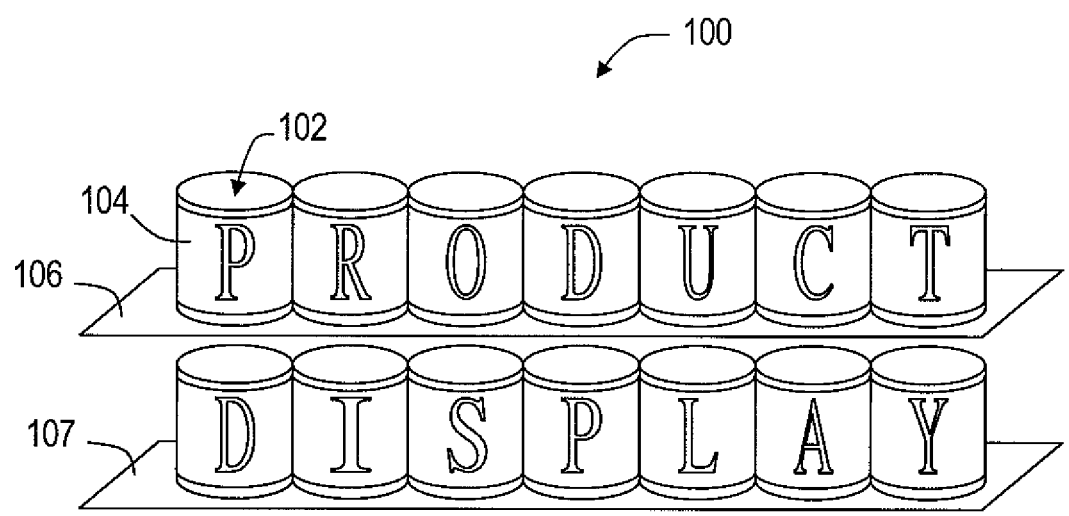
FIGS. 1A and 1B show groups of items incorporating display devices and forming an aggregate display in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Product packaging is designed to attract the consumer and motivate purchasing. However, static product packaging leaves a manufacturer and/or seller of a product unable to fully leverage the limited shelf space allocated to product display.

Efforts have been made to provide more flexible means of attracting the consumer to a product. For example, electronic displays have been used in conjunction with static packaging. Unfortunately, such displays consume space that could have otherwise been used to display more or different products.

Embodiments of the present disclosure provide efficient use of product display space by incorporating dynamic display systems in the packaging of products displayed. For example, a product displayed for sale may include an electronic display device as part of the product's packaging. Moreover, embodiments are configured to provide larger dynamic displays by allowing aggregation of multiple single product package displays into a larger aggregate display. An embodiment of a product package display device is configured to determine its position among product packages associated with an aggregate display and to provide a portion of the aggregate display based on the determined position.

Figure 1B:
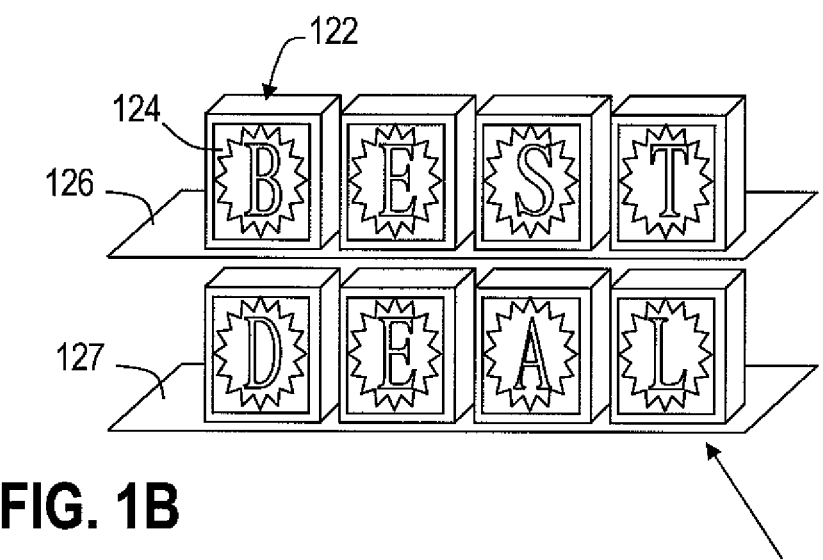

FIGS. 1A and 1B show groups of items incorporating display devices in the item's packaging and forming an aggregate display in accordance with various embodiments. An item may be, for example, any product packaged for display and/or sale. FIG. 1A show a product display 100 comprising canned items 102 disposed on shelves 106-107. The cans 102 do not employ only preprinted static labeling, such as paper or plastic labeling, but rather include labeling comprising a mutable display device 104.

In some embodiments, the display device 104 may be a sheet of electronic paper ("e-paper"). E-paper is a reflective display technology (i.e., e-paper does not require backlighting) that once set to display an image, can retain the image display, until changed, without consuming additional power. Embodiments of e-paper may produce color or gray scale displays.

One embodiment of e-paper comprises a sheet including a multitude of capsules. Each capsule contains charged particles of one color (e.g., black) and oppositely charged particle of a different color (e.g., white). Via electrodes disposed on opposite sides of each capsule, an electric field is applied to the capsules. The electric field causes the particles to move from one side of the capsule to the other in accordance with the field and particle charge polarities. Thus, a selected color may be presented to the viewer. Once the charged particles have been moved to a new position, no power is consumed to keep the particles in the new position. Thus, an e-paper display device continues to display an image after power to the display device is disabled.

Providing an electronic display device 104 as a packaging component provides a number of advantages. A single package can be mutably configured to appeal to various consumer groups based on the attributes of a given group. For example, product information can be displayed based on cultural and/or linguistic attributes of consumers at each location where a product is offered for sale. Moreover, because the information presented via the display device 104 can be dynamically changed, a greater quantity and variety of information can be presented to the consumer than is possible with static labeling. Moreover, visual effects, including both changing text and graphics, in addition to product information, can be presented to attract the consumer to the product.

As shown in FIG. 1A, multiple displays 104 can act in concert to form a larger aggregate display. An aggregate display refers to a display that combines multiple independent display devices to form a larger display. The displays 104 of the cans 102 on shelves 106-107 have combined to form a display spanning multiple instances of the product presented for sale. The larger aggregate display is more likely to attract the consumer's attention than a smaller display, thereby encouraging closer inspection of the product and ultimately providing a greater opportunity to influence the consumers purchasing decision.

FIG. 1B shows a product display 120 including shelves 126-127 on which multiple instances of the boxed product 122 are presented for sale. Each box 122 includes a display device 124 similar to the display 104 described above. As shown, multiple instances of the display 124 can join to provide an aggregate display. In some embodiments, the displays of different products can operate to form an aggregate display. For example, the displays devices 104 and 124 of displays 100 and 120 can join to form an aggregate display.

In some embodiments, the various products or items 102, 122 including display devices 104, 124 that join to form an aggregate display include communication and processing systems that allow an item to determine its position and orientation. Based on the determined position and orientation, the item 102, 122 can determine what portion of the aggregate display to provide. In some embodiments, the items 102, 122 include wireless communication systems and form a mesh network among other items 102, 122 acting as an aggregate display.

FIG. 1B also shows a central controller 130. The central controller 130 may be coupled to the items 122 via wireless network and may provide control and/or display information to the items 122.

FIG. 1A shows the display devices 104 configured to provide characters that combine to form a text message in the aggregate display. Embodiments of the display devices 104, 124 may provide any of a variety of displays. For example, FIG. 1B shows display of characters and graphical framing on display devices 124. Thus, display provided by the display device 104, 124 and an aggregate display may be textual or graphical. Each display device 104, 124 may be configured to provide any appropriate portion of an aggregate display, including any portion of an image from a single pixel to a substantially complete image.

Figure 2:
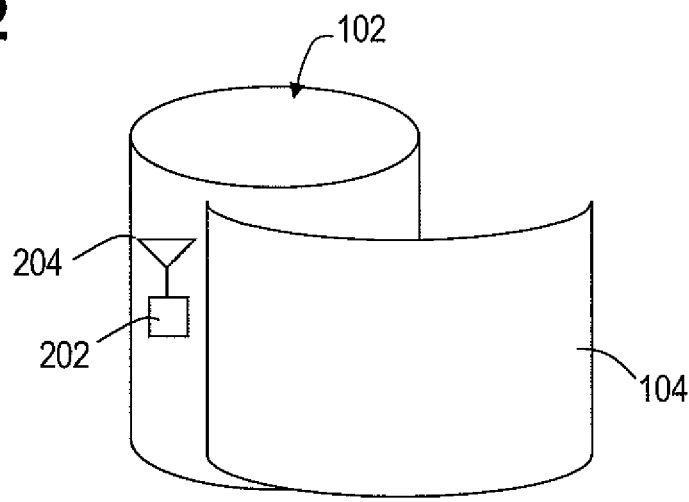
FIG. 2 shows an item configured to operate as part of an aggregate display in accordance with various embodiments.

FIG. 2 shows an item 102 configured to operate as part of an aggregate display in accordance with various embodiments. The item 102 includes a display device 104, as described above, an electronics module 202, and one or more antennas 204. In some embodiments, the electronics module 202 is embodied in a radio frequency identification ("RFID") tag.

RFID technologies can incorporate dynamic networking (i.e., mesh networking) techniques that allow for interconnection of arrays of products or items 102, 122. Mesh networks allow comparably equipped devices to recognize and communicate with one another. Mesh networking further allows for continuous connections and reconfiguration around broken or blocked paths by hopping from node to node until a specified destination is reached.

In some embodiments, the electronics module 202 determines the location of the item 102 based on information regarding radio signal timing provided by a plurality of items 102 comprising an aggregate display. For example, propagation time of a signal transmitted from a given item 102 to each other item 102 varies based on the distance between the items 102. By considering the propagation times from each item 102 to each other item 102, the location of a given item 102 among other items 102 may be determined. Embodiments of the present disclosure encompass any positioning methodology that allows an item 102 to determine its relative position in a group of items 102 forming an aggregate display. Embodiments may determine relative position at a predetermined interval, for example, every 10 seconds, or based on request from the central controller 130 or an item 102. For example, if an item 102 determines that it may have been moved (e.g., by inertial sensor), the item 102 may request a determination of relative position.

The electronics module 202 is coupled to the antenna 204 for transmission and reception of radio frequency signals. Some embodiments include more than one antenna. In some embodiments, more than one of the antenna 204, the electronics module 202, and the display 104 may be integrated in a common substrate. The electronics module 202 may also include a power source, such as a battery, to provide power to the circuitry of the electronics module 202 and the display device 104.

In some embodiments, the electronics module 202 includes power generation circuitry that provides power to the display 104 and/or components of the electronics module 202 based on wireless power transmission. Some embodiments use inductive power transfer, while other embodiments extract energy from radio frequency ("RF") signals, light, heat, or motion and convert the energy to power useable by the display 104 and/or electronics module 202. For example, an embodiment can capture RF energy via the antenna 204 and convert the captured RF energy to voltage/current in the electronics module 202.

Figure 3:
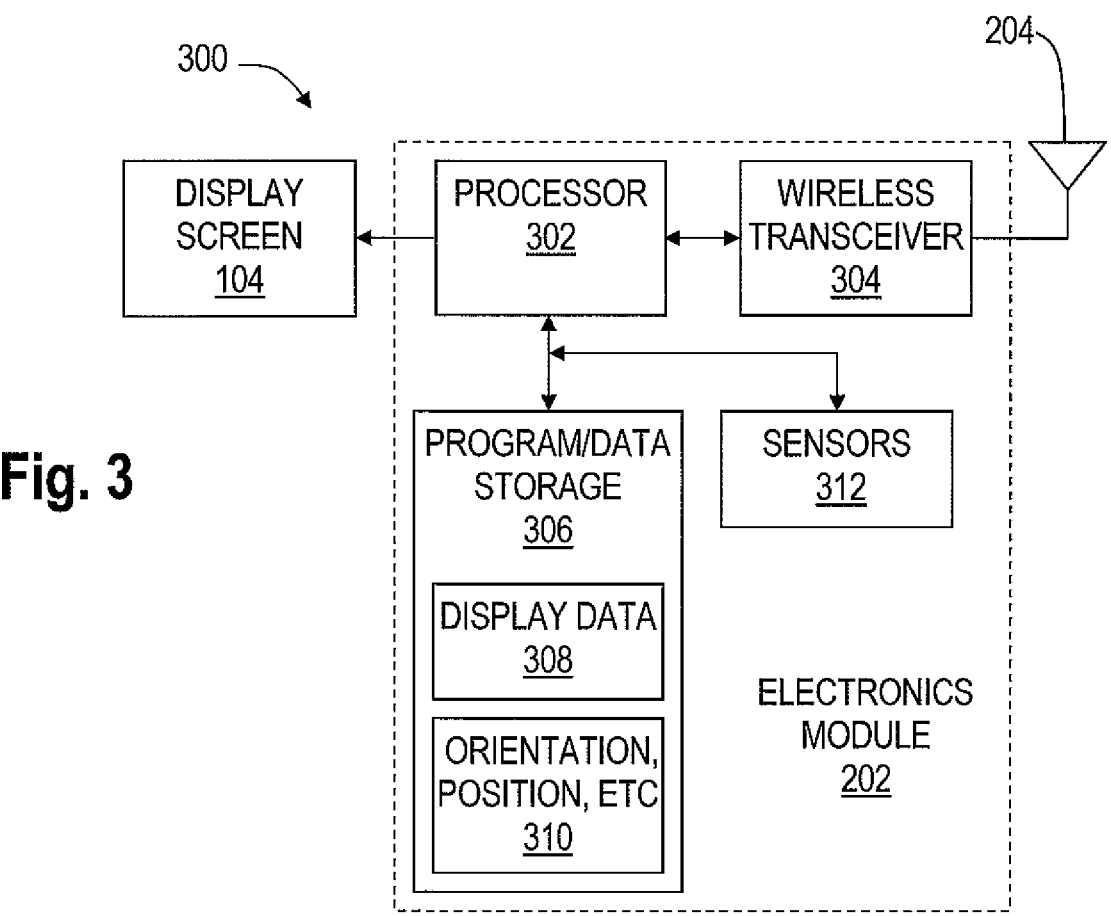
FIG. 3 shows a block diagram of wireless device configured for operation in an aggregate display in accordance with various embodiments.

FIG. 3 shows a block diagram of wireless device 300 configured for operation in an aggregate display in accordance with various embodiments. Embodiments of the wireless device 300 are configured for use in product packaging. The wireless device 300 includes the electronics module 202, the display screen 104, and the antenna 204.

The electronics module 202 includes a processor 302, a wireless transceiver 304 and program/data storage 306. In some embodiments, the electronics module 202 also includes various sensors 312. For example, a temperature sensor, a photosensor, a humidity sensor, a chemical sensor, and/or an inertial sensor (e.g., an accelerometer) may be included. An environmental sensor may be used to communicate about the environment of the module 202 via wireless transmission or via the display 104. For example, a temperature sensor may be used to communicate whether the temperature environment of the item 102 is within specifications. An inertial sensor may be used to provide item 102 orientation information for display generation, or information regarding shock, unacceptable acceleration and/or orientation during shipping/handling that can indicate a likelihood of hidden damage.

The wireless transceiver 304 is coupled to the antenna 204. The transceiver 304 encodes data provided by the processor 302 for transmission, and up-converts data to radio frequencies for transmission. Similarly, the transceiver 304 down-converts and decodes received radio frequency signals and provides the resulting baseband data to the processor 302.

The processor 302 may be, for example, a general-purpose microprocessor, a digital signal processor, a microcontroller, etc. The processor 302 executes program instructions provided from a computer readable storage medium, such as storage 306. Embodiments of the processor 302 can include execution units (e.g., integer, fixed point, floating point, etc.), instruction decoders, storage units (e.g., memory, registers, etc.), input/output sub-systems (e.g., bus interfaces), peripherals (e.g., timers, interrupt controllers, direct memory access controllers, etc.), interconnecting buses, etc.

The storage 306 provides data and program storage for the processor 302. The storage 306 may include any of a variety of memory technologies which the processor 302 is capable of accessing, for example, semiconductor memory, magnetic storage, optical storage, etc. The storage 306 may be volatile, non-volatile, or combinations thereof.

The storage 306 includes display data 308. The display data 308 may include information related to the product 102 and/or other of the manufacturer's products. The display data 308 may include information for display via an aggregate display, a portion of which will be displayed on each item 102 taking part in the aggregate display. The display data 308 may include monochrome and/or color text and/or graphics.

The storage 306 also includes software programming 310 that when executed causes the processor 302 to perform various operations required to generate images on the display screen 104, determine the orientation and/or position of the item 102, communicate via the wireless transceiver 304, etc.

The storage 306 may further include product data. For example, manufacturing and/or packaging information may be included. A date of manufacture may be used to compute and display a product expiration date. Similarly, manufacturing location information can be used to display a product's point of origin.

Some embodiments of the wireless device 300 are configured to identify introduction of related products into a predetermined proximity of the wireless device 300. A related product may be, for example, a different product of the same manufacturer or any product selected to initiate a display. Such identification may initiate a product related display on the display screen 104 or an aggregate display including the wireless device 300. For example, as a shopper carries a selected product into the proximity of an item 102, RF communication between the shopper's product and the item's wireless device 300 identifies the shopper's product. As a result, a display is generated (e.g., via the aggregate display) to inform the consumer of the relationship between the shopper's product and the item 102 on the shelf.

Some embodiments of the wireless device 300 are configured to communicate with the central controller 130. In some embodiments, the central controller 130 provides display information to the wireless device 300. For example, the central controller may transmit store related information (e.g., product discounts, etc.), or locale based product information (e.g., cultural context) to the wireless device 300 of items 102 for display. The central controller 130 may communicate with the wireless device 130 via one or more access points coupled to the central controller 130 and distributed over an area in which the items 102 are to operate.

FIG. 4 shows a flow diagram for a method of providing an aggregate display in accordance with various embodiments. Though depicted sequentially as a matter of convenience, at least some of the actions shown can be performed in a different order and/or performed in parallel. Additionally, some embodiments may perform only some of the actions shown. At least some of the operations shown in FIG. 4 can be implemented via software programming stored in a computer-readable medium (e.g., storage 306) and executed by a processor 302.

In block 402, wireless devices 300 attached to items (e.g., products offered for sale) 102 form a mesh network. In some embodiments the formed mesh network may include only a single type of item (i.e., like products). In other embodiments, the formed mesh network may encompass related products and/or different products. The various devices forming the mesh network communicate with one another wirelessly via radio frequency signals.

In block 404, a wireless device 300 included in the mesh network detects whether a product has moved into a predetermined proximity with the device 300. Based on introduction of the product to the proximity of the wireless device 300, the wireless device 300 or an aggregate display including the wireless device 300 may display information relevant to the product or its relationship to an item 102 including the wireless device 300. One or more devices 300 of the mesh may be configured to provide such product detection. In some embodiments, distributed access points associated with the central controller 130, alone or in conjunction with the mesh network operate to provide the described product detection.

In block 406, the wireless device 300 receives information to be displayed. The information may be provided via the mesh network from a central controller. The information may include product related information, establishment related information, brand related information, or any other information to be displayed by the device 300 or an aggregate display including the wireless device 300. In some embodiments, a central controller transmits the information to be display. The central controller may sub-divide an image to be presented via an aggregate display into display 104 sized portions and transmit a different portion to each wireless device 300. In other embodiments, the central controller may transmit an entire aggregate display image to each device 300 and allow each device to determine the portion to display. In some embodiments, the central controller may transmit control information (e.g., power control information) to the wireless device 300.

In block 408, the devices 300 forming the mesh network organize themselves into an aggregate display. Each device 300 determines its location relative to other instances of the device 300 of the aggregate display. Location determination may be accomplished by analyzing transmission propagation times between the various devices 300 composing the aggregate display.

In block 410, each device 300 included in the aggregate display has determined it location relative to the other elements of the aggregate display, and an image to be presented via the aggregate display is selected. Images to be displayed may be stored in the storage 306 at any time before, during or after the wireless device 300 is associated with the item 102 (i.e., pre-packaging, during packaging, or post packaging).

In block 412, based on the image to be displayed and the determined location of the device 300, the device 300 determines what portion of the image to display on the display screen 104. The processor 302 drives the determined portion of the image onto the display screen 104 in block 414. As each device 300 in the aggregate display drives its display screen 104 with the appropriate image data an aggregate display including multiple devices 300 is provided.

The above discussion is meant to be illustrative of the principles and various embodiments of the present invention. Numerous variations and modifications will become apparent to those skilled in the art once the above disclosure is fully appreciated. For example, while electronic paper has been specifically mentioned as a display medium useable to provide dynamic product packaging, those skilled in the art will understand that other mutable display media may be applicable as well. It is intended that the following claims be interpreted to embrace all such variations and modifications.

What is claimed is:

1. A system, comprising:
a plurality of display systems, each comprising a display device;
wherein the display systems are configured to form an aggregate display including the display device of each display system; and
wherein each display system is configured to:
determine the relative location of the display system among the plurality of display systems, and based on the determined location:
select a portion of a complete image stored in the display system for display, wherein each of the display systems is to present a portion of the complete image on the aggregate display, and
present, via the display device, the selected portion of the image as part of the aggregate display.

2. The system of claim 1, wherein each display system further comprises a transceiver configured to couple the display system to other of the plurality of display systems.

3. The system of claim 2, wherein each display system further comprises a controller coupled to the display device and the transceiver, wherein the controller is configured to determine the location of the display system based on signals detected by the transceiver.

4. The system of claim 1, wherein the display device comprises electronic paper, and the transceiver comprises a radio frequency identification tag configured to drive the display device and to wirelessly couple the display device to other of the plurality of display devices.

5. The system of claim 1, wherein each display system is a part of packaging of a product presented for sale, and the plurality of display systems are disposed to allow the display devices to form a larger display.

6. The system of claim 1, wherein the display systems are configured to be powered via wireless power transmission.

7. The system of claim 1, further comprising a central controller configured to wirelessly transmit information to the display systems for display via the aggregate display.

8. A method, comprising:
providing an aggregate display comprising display devices of a plurality of wireless devices; and
determining, by a given device of the plurality of wireless devices, via detection of wireless signals, a location of the display of the given device among the displays of the plurality of wireless devices;
selecting, based on the determined location, a portion of a complete image stored in the given device for display, wherein each of the wireless devices is to present a portion of the complete image on the aggregate display; and
presenting, via the display device, the selected portion of the image as part of the aggregate display.

9. The method of claim 8, further comprising displaying on the aggregate display information related to a product comprising the given device.

10. The method of claim 8, further comprising detecting ingress of a product comprising a wireless transmitter into proximity of the aggregate display, wherein the product is not part of the aggregate display.

11. The method of claim 10, further comprising displaying, via the aggregate display, responsive to the detected ingress, information related to the detected product and a different product comprising one of a product comprising the given device and a product proximate to the given device.

12. The method of claim 8, further comprising receiving wirelessly from a central transmitter, information not related to a product comprising the given device, to be displayed on the aggregate display.

13. An article, comprising:
packaging in which a product is offered for sale, the packaging comprising:
an electrically mutable display device;
a controller coupled to the display device and configured to drive the display device;
a wireless transceiver coupled to the controller; and
a storage device containing aggregate display information comprising an image to be displayed as an aggregate display via display devices of multiple instances of the article;
wherein the controller is configured to:
wirelessly communicate with a different instance of the article;
cause the display device to operate as a portion of an aggregate display comprising a plurality of packaging display devices based on wireless communication with the different instance of the article; and
select a sub-portion of the image to provide to the display device based on a determination by the controller of the position of the display device in the aggregate display.

14. The article of claim 13, wherein the display device comprises a flexible display sheet that displays an image after removal of power from the display device.

15. The article of claim 13, wherein the wireless transceiver is embodied in a radio frequency identification tag.

16. The article of claim 13, wherein the controller is configured to determine the location of the article within the aggregate display based on wireless signals received via the wireless transceiver.

17. The article of claim 13, wherein the packaging further comprises an inertial sensor to provide package orientation information, and wherein the controller is to orient display of a selected sub-portion of the aggregate display information based on the package orientation information provided by the inertial sensor.

18. The article of claim 13, wherein the controller is to:
detect movement of a good offered for sale to within a predetermined proximity of the product;
identify a relationship between the good and the product; and
present information related to the relationship via the aggregate display.

* * * * *